(12) United States Patent
Kumar et al.

(10) Patent No.: US 9,608,896 B2
(45) Date of Patent: Mar. 28, 2017

(54) SERVICE NODE ORIGINATED SERVICE CHAINS IN A NETWORK ENVIRONMENT

(71) Applicant: CISCO TECHNOLOGY, INC., San Jose, CA (US)

(72) Inventors: Surendra M. Kumar, San Ramon, CA (US); Nagaraj A. Bagepalli, Fremont, CA (US); Abhijit Patra, Saratoga, CA (US); Paul Quinn, Wellesley, MA (US); James N. Guichard, New Boston, NH (US); Hendrikus G. P. Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/092,117

(22) Filed: Apr. 6, 2016

(65) Prior Publication Data

US 2016/0218956 A1    Jul. 28, 2016

Related U.S. Application Data

(63) Continuation of application No. 14/208,453, filed on Mar. 13, 2014, now Pat. No. 9,344,337.

(51) Int. Cl.
*H04L 12/28* (2006.01)
*H04L 12/751* (2013.01)
(Continued)

(52) U.S. Cl.
CPC ............ *H04L 45/02* (2013.01); *H04L 41/08* (2013.01); *H04L 41/12* (2013.01); *H04L 45/308* (2013.01); *H04L 45/38* (2013.01)

(58) Field of Classification Search
None
See application file for complete search history.

(56) References Cited

U.S. PATENT DOCUMENTS 7,657,940 B2   2/2010   Portolani et al.
7,668,116 B2   2/2010   Wijnands et al.
(Continued)

OTHER PUBLICATIONS

PCT Aug. 20, 2015 International Search Report and Written Opinion of the International Searching Authority from International Application Serial No. PCT/US2015/020242; 12 pages.

(Continued)

*Primary Examiner* — Phirin Sam
(74) *Attorney, Agent, or Firm* — Patent Capital Group

(57) ABSTRACT

An example method for service node originated service chains in a network environment is provided and includes receiving a packet at a service node in a network environment that includes a plurality of service nodes and a central classifier, analyzing the packet for a service chain modification or a service chain initiation, classifying the packet at the service node to a new service chain based on the analysis, initiating the new service chain at the service node if the analysis indicates service chain initiation, and modifying an existing service chain for the packet to the new service chain if the analysis indicates service chain modification. In specific embodiments, the analysis includes applying classification logic specific to the service node. Some embodiments, service node attributes and order of service nodes in substantially all service chains configured in the network may be received from a central controller.

20 Claims, 5 Drawing Sheets

(51) Int. Cl.
*H04L 12/24* (2006.01)
*H04L 12/725* (2013.01)
*H04L 12/721* (2013.01)

(56) References Cited

U.S. PATENT DOCUMENTS

| | | | |
|---|---|---|---|
| 7,684,321 | B2 | 3/2010 | Muirhead et al. |
| 7,738,469 | B1 | 6/2010 | Shekokar et al. |
| 7,814,284 | B1 | 10/2010 | Glass et al. |
| 7,831,693 | B2 | 11/2010 | Lai |
| 7,860,095 | B2 | 12/2010 | Forissier et al. |
| 7,860,100 | B2 | 12/2010 | Khalid et al. |
| 7,895,425 | B2 | 2/2011 | Khalid et al. |
| 7,899,012 | B2 | 3/2011 | Ho et al. |
| 7,907,595 | B2 | 3/2011 | Khanna et al. |
| 7,990,847 | B1 | 8/2011 | Leroy et al. |
| 8,000,329 | B2 | 8/2011 | Fendick et al. |
| 8,018,938 | B1 | 9/2011 | Fromm et al. |
| 8,094,575 | B1 | 1/2012 | Vadlakonda et al. |
| 8,180,909 | B2 | 5/2012 | Hartman et al. |
| 8,195,774 | B2 | 6/2012 | Lambeth et al. |
| 8,280,354 | B2 | 10/2012 | Smith et al. |
| 8,281,302 | B2 | 10/2012 | Durazzo et al. |
| 8,291,108 | B2 | 10/2012 | Raja et al. |
| 8,311,045 | B2 | 11/2012 | Quinn et al. |
| 8,316,457 | B1 | 11/2012 | Paczkowski et al. |
| 8,442,043 | B2 | 5/2013 | Sharma et al. |
| 8,464,336 | B2 | 6/2013 | Wei et al. |
| 8,520,672 | B2 | 8/2013 | Guichard et al. |
| 8,601,152 | B1 | 12/2013 | Chou |
| 8,612,612 | B1 | 12/2013 | Dukes et al. |
| 8,676,980 | B2 | 3/2014 | Kreeger et al. |
| 8,700,892 | B2 | 4/2014 | Bollay |
| 8,730,980 | B2 | 5/2014 | Bagepalli et al. |
| 8,743,885 | B2 | 6/2014 | Khan et al. |
| 8,762,534 | B1 | 6/2014 | Hong et al. |
| 8,762,707 | B2 | 6/2014 | Killian |
| 8,792,490 | B2 | 7/2014 | Jabr et al. |
| 8,793,400 | B2 | 7/2014 | McDysan |
| 8,825,070 | B2 | 9/2014 | Akhtar et al. |
| 8,830,834 | B2 | 9/2014 | Sharma et al. |
| 8,904,037 | B2 | 12/2014 | Haggar et al. |
| 9,001,827 | B2 | 4/2015 | Appenzeller |
| 9,077,661 | B2 | 7/2015 | Andreasen et al. |
| 9,088,584 | B2 | 7/2015 | Feng et al. |
| 9,130,872 | B2 | 9/2015 | Kumar et al. |
| 9,143,438 | B2 | 9/2015 | Khan et al. |
| 9,160,797 | B2 | 10/2015 | McDysan |
| 9,178,812 | B2 | 11/2015 | Guichard et al. |
| 9,253,274 | B2 | 2/2016 | Quinn et al. |
| 9,300,585 | B2 | 3/2016 | Kumar et al. |
| 9,319,324 | B2 * | 4/2016 | Beheshti-Zavareh ........... H04L 47/2408 |
| 9,344,337 | B2 | 5/2016 | Kumar et al. |
| 9,379,931 | B2 | 6/2016 | Bosch et al. |
| 2001/0023442 | A1 | 9/2001 | Masters |
| 2002/0131362 | A1 | 9/2002 | Callon |
| 2002/0156893 | A1 | 10/2002 | Pouyoul et al. |
| 2002/0167935 | A1 | 11/2002 | Nabkel et al. |
| 2003/0023879 | A1 | 1/2003 | Wray |
| 2003/0088698 | A1 | 5/2003 | Singh et al. |
| 2003/0110081 | A1 | 6/2003 | Tosaki |
| 2003/0120816 | A1 | 6/2003 | Berthaud et al. |
| 2003/0226142 | A1 | 12/2003 | Rand |
| 2004/0109412 | A1 | 6/2004 | Hansson |
| 2004/0148391 | A1 | 7/2004 | Lake et al. |
| 2004/0199812 | A1 | 10/2004 | Earl et al. |
| 2004/0264481 | A1 | 12/2004 | Darling et al. |
| 2004/0268357 | A1 | 12/2004 | Joy et al. |
| 2005/0152378 | A1 | 7/2005 | Bango et al. |
| 2005/0286540 | A1 | 12/2005 | Hurtta et al. |
| 2008/0177896 | A1 | 7/2008 | Quinn et al. |
| 2009/0006152 | A1 | 1/2009 | Timmerman et al. |
| 2010/0080226 | A1 | 4/2010 | Khalid et al. |
| 2011/0131338 | A1 | 6/2011 | Hu |
| 2012/0331135 | A1 | 12/2012 | Alon et al. |
| 2013/0003736 | A1 | 1/2013 | Szyszko |
| 2013/0040640 | A1 | 2/2013 | Chen et al. |
| 2013/0163606 | A1 | 6/2013 | Bagepalli et al. |
| 2014/0050223 | A1 * | 2/2014 | Foo .......... H04L 47/2441 370/400 |
| 2014/0067758 | A1 * | 3/2014 | Boldyrev .......... H04L 67/1097 707/610 |
| 2015/0003455 | A1 * | 1/2015 | Haddad .......... H04L 45/38 370/392 |
| 2015/0156035 | A1 | 6/2015 | Foo et al. |
| 2015/0180767 | A1 | 6/2015 | Tam et al. |
| 2015/0188949 | A1 * | 7/2015 | Mahaffey .......... H04L 63/20 726/1 |
| 2015/0195197 | A1 * | 7/2015 | Yong .......... H04L 45/74 370/392 |
| 2015/0236948 | A1 * | 8/2015 | Dunbar .......... H04L 45/22 370/225 |
| 2015/0334027 | A1 | 11/2015 | Bosch et al. |
| 2016/0139939 | A1 | 5/2016 | Bosch et al. |

OTHER PUBLICATIONS

Jiang, et al., "An Architecture of Service Function Chaining," IETF Network Working Group Internet Draft, draft-jiang-sfc-arch-01.txt, Feb. 14, 2014; 12 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

"IEEE Standard for the Functional Architecture of Next Generation Service Overlay Networks, IEEE Std. 1903-2011," IEEE, Piscataway, NJ, Oct. 7, 2011; 147 pages.

U.S. Appl. No. 15/171,892, filed Jun. 2, 2016, entitled "System and Method for Hosting Mobile Packet Core and Value-added Services Using a Software Defined Network and Service Chains," Inventor(s): Hendrikus G.P. Bosch, et al.

* cited by examiner

SERVICE NODE ORIGINATED SERVICE CHAINS IN A NETWORK ENVIRONMENT

RELATED APPLICATION

This Application is a continuation (and claims the benefit of priority under 35 U.S.C. §120) of U.S. application Ser. No. 14/208,453, filed Mar. 13, 2014, entitled "SERVICE NODE ORIGINATED SERVICE CHAINS IN A NETWORK ENVIRONMENT," Inventor SURENDRA M. KUMAR, ET AL. The disclosure of the prior application is considered part of (and are incorporated by reference in) the disclosure of this application.

TECHNICAL FIELD

This disclosure relates in general to the field of communications and, more particularly, to service node originated service chains in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for service node originated service chains in a network environment is provided and includes receiving a packet at a service node in a network environment that includes a plurality of service nodes and a central classifier, analyzing (e.g., parsing, reading, examining, evaluating, assessing, investigating, probing, etc.) the packet for a service chain modification or a service chain initiation, classifying (e.g., categorizing, ordering, tagging, labeling, grouping, etc.) the packet at the service node to a new service chain based on the analysis, initiating the new service chain at the service node if the analysis indicates service chain initiation, and modifying an existing service chain for the packet to the new service chain if the analysis indicates service chain modification.

As used herein, the term "service node" comprises a physical or virtual network element that can provide one or more network services such as firewall, Deep Packet Inspection (DPI), Lawful Intercept (LI), etc. to packets traversing the network. As used herein, the term "network element" is meant to encompass computers, network appliances, servers, routers, switches, gateways, bridges, load balancers, intrusion detection appliances, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. The term "service chain" refers to one or more network services chained (e.g., connected, attached, coupled, etc.) in a specific order to provide a composite service to packets traversing the network.

Example Embodiments

Figure 1:
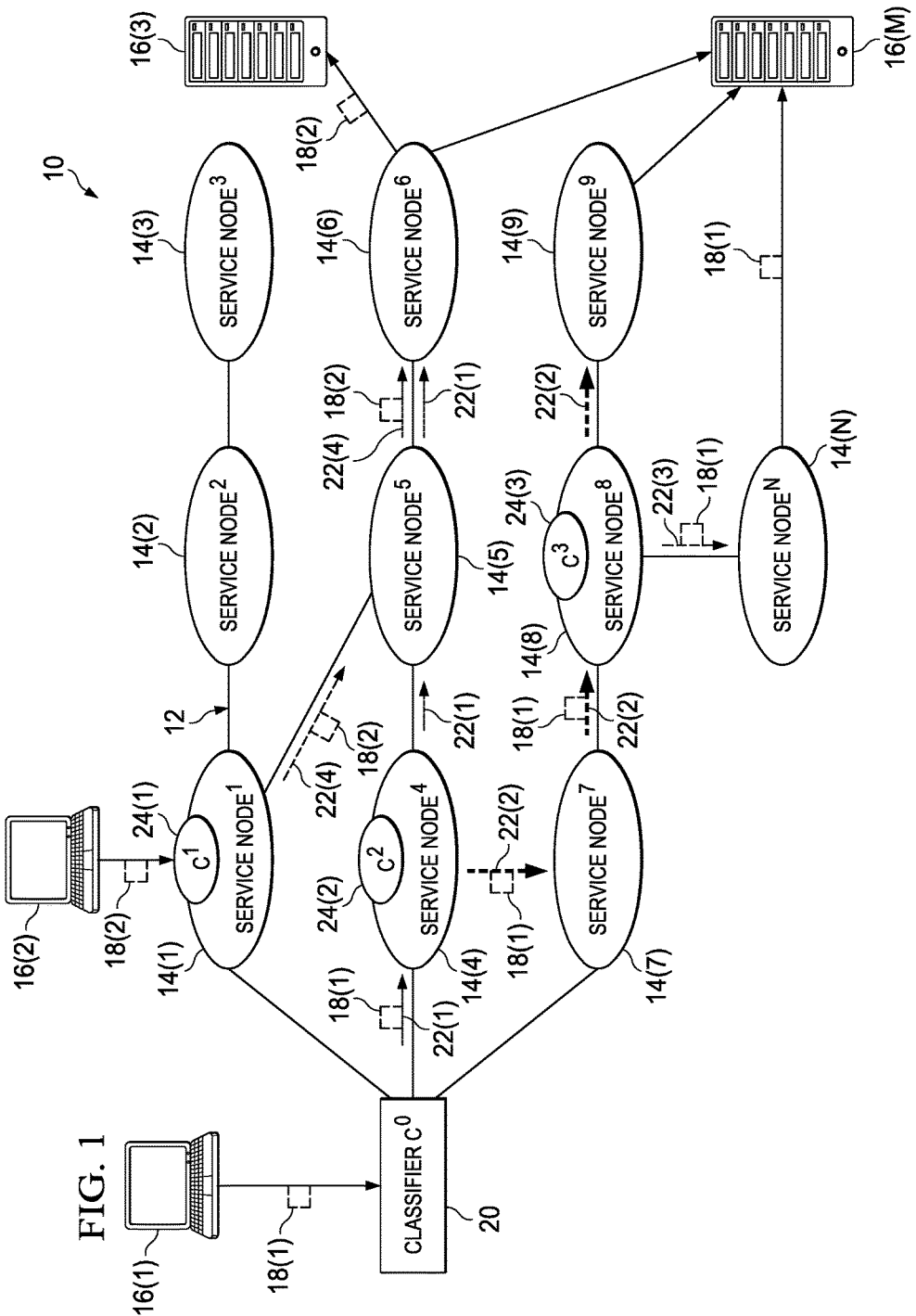
FIG. 1 is a simplified block diagram illustrating a communication system for service node originated service chains in a network environment.

Turning to FIG. 1, FIG. 1 is a simplified block diagram illustrating a communication system 10 for service node originated service chains in a network environment in accordance with one example embodiment. FIG. 1 illustrates a network 12 comprising a plurality of service nodes 14(1)-14(N), where N can represent any suitable integer greater than 1. A plurality of workloads 16(1)-16(M) may communicate over network 12. For example, workload 16(1) may send packet 18(1) to workload 16(M); workload 16(2) may send packet 18(2) to workload 16(3); and so on. A central classifier 20 in network 12 may classify packets (e.g., packet 18(1)) appropriately to various service chains 22. For example, service chain 22(1) may be specified as a sequence of service nodes 14(4)→14(5)→14(6); service chain 22(2) may be specified as another sequence of service nodes 14(4)→14(7)→14(8)→14(9); service chain 22(3) may be specified as yet another sequence of service nodes, 14(8)→14(N); service chain 22(4) may be specified as yet another sequence of service nodes 14(1)→14(5)→14(6); and so on.

According to various embodiments of communication system 10, network 12 may be configured with secondary classifiers 24 that can inject or switch service chains 22 dynamically based on classification of packets at certain service nodes 14(1)-14(N). For example, secondary classifier 24(1) may be located at service node 14(1); secondary classifier 24(2) may be located at service node 14(4); secondary classifier 24(3) may be located at service node 14(8); and so on. Secondary classifier 24(1) may direct packet 18(2) on to service chain 22(4) as it traverses network 12 to workload 16(3); secondary classifier 24(2) may dynamically modify the service chain assigned by central classifier 20 to packet 18(1) and divert packet 18(1) from service chain 22(1) to 22(2); secondary classifier 24(3) may further modify the service chain assigned by secondary classifier 24(2) to packet 18(1) and divert packet 18(1) from service chain 22(2) to service chain 22(3).

As used herein, the term "classifier" refers to an application (e.g., logical entity) executing in a network element that identifies and classifies network traffic (e.g., data traversing the network, usually formatted into packets) to follow different service chains based on pre-configured service characteristics (e.g., packets matching a specific tuple of fields in Ethernet, Internet Protocol (IP), Transmission Control Protocol (TCP), hyper-text transfer protocol (HTTP) headers, etc.) or service policies (e.g., access ports, quality of service, etc.) applied to the network traffic. The classification may include a locally instantiated policy and customer or network or service profile matching of traffic flows for identification of appropriate outbound forwarding actions. The classifier creates a service path (e.g., a path that traffic flows are forwarded through in a service chain) comprising the series of service nodes that together form the service chain. There may be multiple paths in a particular service chain. Each service chain processes a specific service flow of network traffic.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network services are widely deployed and essential in many networks. The services can provide a range of functions such as security, wide area network (WAN) acceleration, and server load balancing. Services that form part of an overall composite service may be physically located at different points in the network infrastructure, such as the wide area network, data center, enterprise, campus, etc. For some network services, traffic is forwarded through a sequence of network functions, which usually have dedicated capabilities other than forwarding, e.g. firewall. Forwarding traffic along a sequence of service processing functions is typically based on service characteristics. For example, certain traffic may be directed to a domain border gateway for monitoring and charging; certain other traffic may be steered through a load balancer to distribute performance pressure before forwarding to data center services; mobile network operators may split mobile broadband traffic and steer them along different offloading paths; firewalls may be used to filter traffic for Intrusion Detection System (IDS)/Intrusion Protection System (IPS); security gateways may be used to encrypt/decrypt traffic; certain traffic that traverses different network technology segments such as IPv4/IPv6 may be directed to a carrier grade network address translator (CGNAT); etc.

In some network architectures (e.g., Cisco Distributed Virtual Switch (DVS)), vPath integrates services with the network. vPath enables traffic redirection, service chaining and infrastructure programmability. vPath uses a service overlay to steer traffic to the services. A vPath 3.0 service header or network service header (NSH) is used as an encapsulation header to carry a forwarding state identification (e.g., service-path-identifier and a service-index). The service header can uniquely identify a particular service chain and location of the packet carrying the service header within the service chain at any given time. The service header can facilitate determining a next hop service function when used in conjunction with a service-forwarding table, which represents a forwarding state at the service nodes. In such network architectures, the central classifiers impose the service header (e.g., vPath 3.0; NSH) on the selected traffic and initializes the service path-identifier and the service-index in the service header. After each service delivery, the service index is decremented at the service node to indicate service delivery.

In some network architectures, the service chains are specified by a network operator in an external central controller (e.g., external to the service nodes). The controller resolves service chain identifiers to corresponding forwarding states in the network identified by respective service-path-identifiers. The controller distributes the forwarding states and the corresponding service-path-identifiers identifiers across the entire network infrastructure via proprietary control protocols or standard protocols like border gateway protocol (BGP). Network elements (such as the switches and routers) acting as the classifiers select and classify traffic to be forwarded along various service chains.

However, existing service chaining schemes limit selection and initiation of service chains to centrally located network nodes in the network. In addition, service chain selection is static (e.g., service chain does not change for the life of a specific flow in the network). In typical service chain architectures, network traffic is delivered to a few central classifiers, which alone identify traffic and classify the network traffic into service flows. The service flows are forwarded to respective service chains according to forwarding rules configured in the central classifiers. After a particular service flow is configured and set up in the network, the service chain configured for the service flow does not change; all packets meeting the relevant service characteristics and policies are sent through the corresponding service chain of the service flow, irrespective of any other criteria (e.g., change in the network topology such as addition or deletion of servers).

Communication system 10 is configured to address these issues (among others) to offer a system and method for service node originated service chains in a network environment. According to various embodiments, service nodes 14(1)-14(N) maybe enabled to initiate and/or modify service chains into network 12 based on classification criteria specific to respective service node 14(1)-14(N) or the application (e.g., composite service) that respective service node 14(1)-14(N) is part of. In some embodiments, the injection of the service chain may either start a new service chain on traffic entering respective service node 14(1)-14(N); in other embodiments, the existing service chain may be replaced with a different service chain at respective 14(1)-14(N). Respective service node 14(1)-14(N) may program network 12 to associate flows (including non-existent or future flows) to the injected service chain. Embodiments of communication system 10 can enable service nodes 14(1)-14(N) to dynamically (e.g., in real-time) specify service chains for traffic and to steer the traffic on a graph topology (e.g., formed by service nodes 14(1)-14(N)).

Assume, merely for the sake of example, and not as a limitation, that packet 18(1) is received at service node 14(4). Secondary classifier 24(2) at service node 14(4) may analyze packet 18(1) for a service chain modification or a service chain initiation. In various embodiments, the analysis can comprise application classification specific logic particular to service node 14(4). Assume, merely for example purposes and not as a limitation, that central classifier 20 is configured to send substantially all traffic to workload 16(M) (which can represent a website application) through service chain 22(1); assume also that service node 14(4) can perform DPI and determine whether the packet includes malicious content. Service node 14(4) may be configured with appropriate DPI specific classification logic, including policies and rules that specify steering malicious traffic to an anti-virus network service executing on service node 14(7), and to other service nodes appropriately.

Assume that service node 14(4) performs DPI on packet 18(1) and determines that it contains malicious content. Based on the analysis, secondary classifier 24(2) may classify packet 18(1) at service node 14(4) to a new service chain 22(2), which includes steering packet 18(1) to service node 14(7) and other service nodes. Moreover, the analysis also includes determining whether packet 18(1) is received on a service overlay (e.g., if packet 18(1) is already assigned to a specific service chain), or in an underlay (e.g., if packet 18(1) is not already assigned to a specific service chain). If the packet is received on the service overlay, the analysis may indicate service chain modification; if the packet is received in the underlay, the analysis may indicate service chain initiation.

Secondary classifier 24(2) may modify existing service chain 22(1) of packet 18(1) to new service chain 22(2) if its analysis indicates service chain modification. In various embodiments, packet 18(1) may be associated with a service header associated with the service overlay. The service header may comprise a NSH or vPath 3.0 header, including a service path field (e.g., identifies the forwarding path of a specific service chain) and a service index field (e.g., specifying a location within the forwarding path). Secondary classifier 24(2) may update the service path field and the service index field in the service header of packet 18(1) to modify existing service chain 22(1) to new service chain 22(2) for packet 18(1). Substantially all subsequent packets belonging to the same traffic flow as packet 18(1) may be subjected to new service chain 22(2) as long as the DPI specific classification logic (and other parameters) indicate as such.

In some embodiments, the existing service chain may be assigned by central classifier 20 or by another service node. For example, secondary classifier 24(3) at service node 14(8) may reclassify the packet, and modify existing service chain 22(2) (assigned by service node 14(4)) to new service chain 22(3). Note that the modifying (and initiation) of service chains may be performed in real time (e.g., concurrently as the packets flow through the service node).

In another example, assume that packet 18(2) is received at service node 14(1) from workload 16(2). Note that workload 16(2) may be included within a local area network comprising service node 14(1) in some embodiments; in other embodiments, workload 16(2) may be outside the local area network comprising service node 14(1) and may communicate with service node 14(1) via various other network elements that are not shown in the figure. Secondary classifier 24(1) at service node 14(1) may analyze packet 18(2) for a service chain modification or a service chain initiation. Based on the analysis, secondary classifier 24(1) may classify packet 18(2) at service node 14(1) to a new service chain 22(4). Secondary classifier 24(1) may initiate new service chain 22(4) at service node 14(1) if its analysis indicates service chain initiation. In yet another example, service node 14(1) may be coupled to workload 16(2) (e.g., both executing through the same application, etc.), and consequently, packet 18(2) may be initiated at service node 14(1). In such a scenario, packet 18(2) may not be received at service node 14(1) on any service overlay or underlay, but rather, may be received at service node 14(1) by virtue of origination thereat. Secondary classifier 24(1) may analyze packet 18(2) and classify it accordingly.

In addition, even though packet 18(2) does not include a service header, secondary classifier 24(1) may impose a service header appropriately. For example, secondary classifier 24(1) may choose a specific service index and service path identifying service chain 22(4), and generate a service header for packet 18(2) including the specific service index and service path.

In various embodiments, secondary classifiers 24(1)-24(3) may receive service node attributes (including location of respective service nodes 14(1)-14(N) in network 12) and order of service nodes 14(1)-14(N) in substantially all service chains configured in network 12 from a central controller. The interaction with the controller may involve a standards based Representational state transfer (REST) interface or a proprietary interface, as appropriate.

In some embodiments, service nodes 14(1)-14(N) may be suitably modified by secondary classifiers (e.g., 24(1)-24(3)) to initiate service paths (e.g., similar to central classifier 20) and change (e.g., re-steer) service paths, which result in dynamic service paths in network 12. Service nodes 14(1)-14(N) suitably modified by secondary classifiers (e.g., 24(1)-24(3)) can use solution specific (e.g., custom, network operator specified, etc.) logic as a policy to select the service paths, and can pre-program service paths in the infrastructure. In addition, service nodes 14(1)-14(N) suitably modified by secondary classifiers (e.g., 24(1)-24(3)) can use offloads when selecting service paths and change the service path based on flow-state (e.g., a set of network properties such as flow duration, connection status, etc.; a network operator can define a specific flow state based on any suitable network property(ies)). Moreover, legacy service chains (e.g., VLAN stitching based or hard-wired) can be bridged with overlay based chains suitably. For example, the modified service node can classify traffic coming from the legacy service chain and originate an overlay based service chain in the service node according to service node specific logic, as appropriate.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment of home network 17 may be configured over a physical infrastructure that may include WLANs (including Bluetooth), and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, service nodes 14(1)-14(N) can comprise physical service appliances (e.g., stand-alone boxes) plugged into network 12 appropriately. In other embodiments, service nodes 14(1)-14(N) can comprise service cards attached internally within another network element, such as a router or switch in network 12. In yet other embodiments, service nodes 14(1)-14(N) can comprise applications executing on suitable network elements (e.g., servers, switches, routers, etc.) in network 12. In some embodiments, service nodes 14(1)-14(N) can comprise a combination of the above.

In various embodiments, central classifier 20 and secondary classifiers 24(1)-24(3) may comprise applications executing on suitable network elements to perform their respective operations. Secondary classifiers 24(1)-24(3) may execute concurrently with service nodes 14(1)-14(N). Note that any suitable number of secondary classifiers and central classifier 20 may be instantiated in network 12 within the broad scope of the embodiments. In various embodiments, central classifier 20 may differ from secondary classifiers 24(1)-24(3) in at least one functionality; namely, central classifier 20 may only initiate service chains according to configured policies and rules, and may not modify existing service chains, if any.

Workloads 16(1)-16(M) may represent any suitable network endpoint. In various embodiments, workloads 16(1)-16(M) may comprise separate computing devices running applications (e.g., server/client applications in client-server network architecture). In other embodiments, workloads 16(1)-16(M) may comprise separate virtual machines on the same or different computing devices (e.g., server blades in a data center). In some embodiments, workloads 16(1)-16(M) may include server blades configured in one or more chassis.

In various embodiments, workloads 16(1)-16(M), central classifier 20, and service nodes 14(1)-14(N) may be connected in network 12 over a distributed virtual switch, which can include physical and virtual switches and any suitable network element capable of receiving packets, and forwarding packets appropriately in a network environment. Any number of workloads and service nodes may be active within network 12 within the broad scope of the embodiments.

Figure 2:
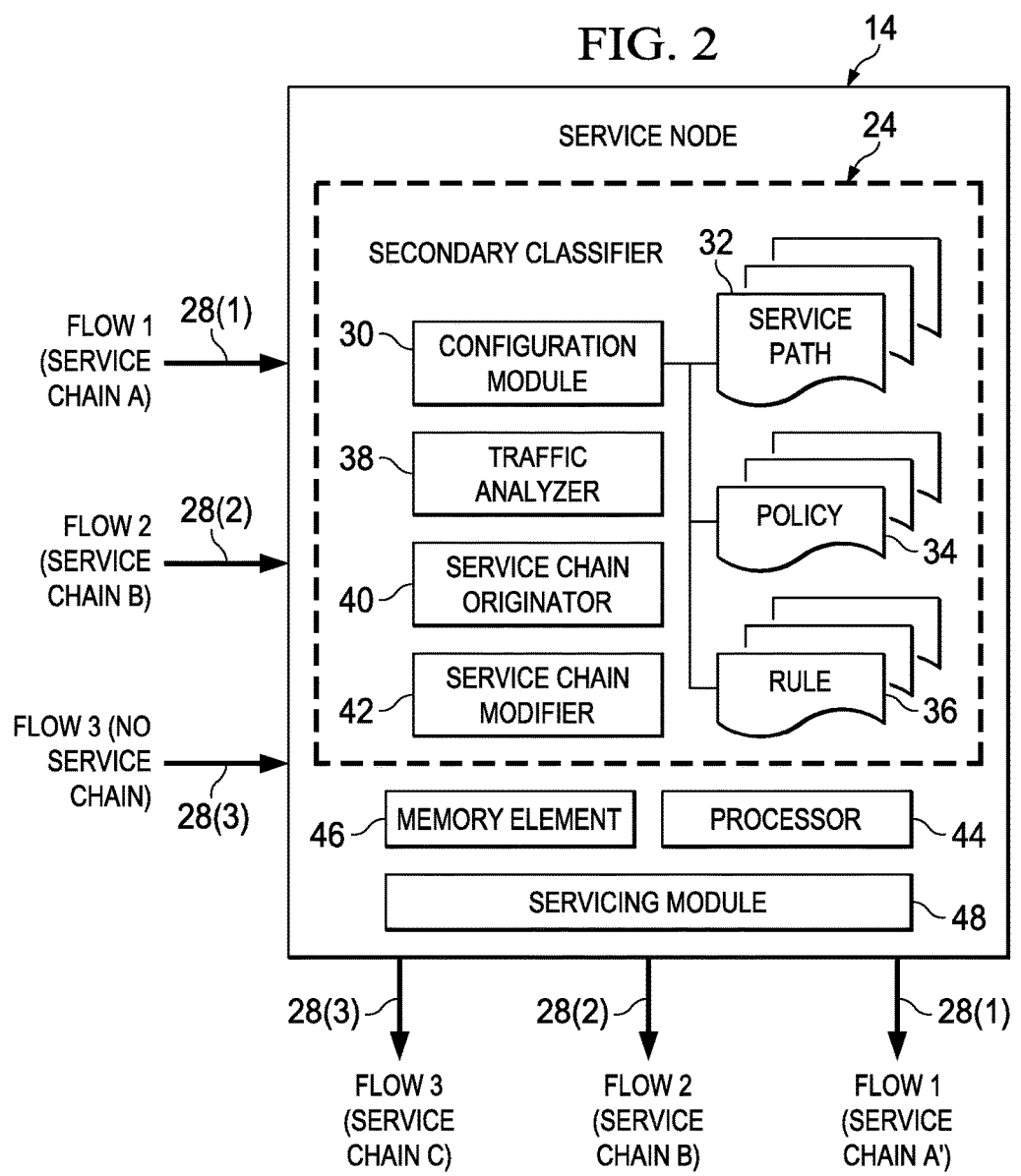
FIG. 2 is a simplified block diagram illustrating another embodiment of the communication system.

Turning to FIG. 2, FIG. 2 is a simplified block diagram illustrating example details of another embodiment of communication system 10. Example service node 14 may include a secondary classifier 24. A plurality of flows (e.g., a flow comprises a set of unidirectional IP packets having common characteristic properties including source IP address, source TCP port, etc.; 28(1)-28(3)) may traverse service node 14 at any given instant. Merely as examples and not as limitations, assume that flow 28(1) is classified to service chain A; flow 28(2) is classified to service chain B; and flow 28(3) is not classified to any service chain. Secondary classifier 24 in service node 14 may comprise a configuration module 30, including a set of service paths 32, policies 34, and rules 36 applicable to certain solutions and services provided by service node 14. Secondary classifier 24 may also include a traffic analyzer 38, a service chain originator 40 and a service chain modifier 42. Service node 14 may include a processor 44, a memory element 46, and a servicing module 48.

During configuration, configuration module 30 may be pre-programmed with service paths 32, policies 34 and rules 36 appropriately. For example, a network operator may manually configure configuration module 30 with service paths 32, policies 34 and rules 36. In another example, service node 14 may interface with a central controller and obtain service node attributes and order of service nodes in substantially all service chains configured in network 12. The interaction with the controller may involve a standards based REST interface or a proprietary interface, as appropriate.

During operation, as flows 28(1)-28(3) are processed by service node 14, secondary classifier 24 may perform various operations. For example, traffic analyzer 38 may analyze flows 28(1)-28(3) and determine: (1) whether they are assigned to service chains (e.g., by another service node or by a classifier); and (2) whether a service chain modification or service chain initiation is appropriate. Traffic analyzer 38 may detect a service header in flows 28(1) and 28(2) and determine that they are pre-assigned to service chains. Traffic analyzer 38 may apply policies 34 and rules 36 on flows 28(1)-28(3). In some embodiments, traffic analyzer 38 may change service paths based on flow states. Traffic analyzer 38 may determine that flow 28(1) can receive a service chain modification, flow 28(2) can remain unchanged, and flow 28(3) can be assigned to a new service chain.

Accordingly, service chain modifier 42 may update the service header in packets belonging to flow 28(1) with information from service paths 32 to indicate a modified service chain A'. Service chain originator 40 may generate a new service header for packets in flow 28(3) with information from service paths 32 to indicate a new service chain C. Servicing module 48 may service flows 28(1)-28(3) appropriately, and forward them on to the next service hop according to the new service chains, as appropriate.

Figure 3:
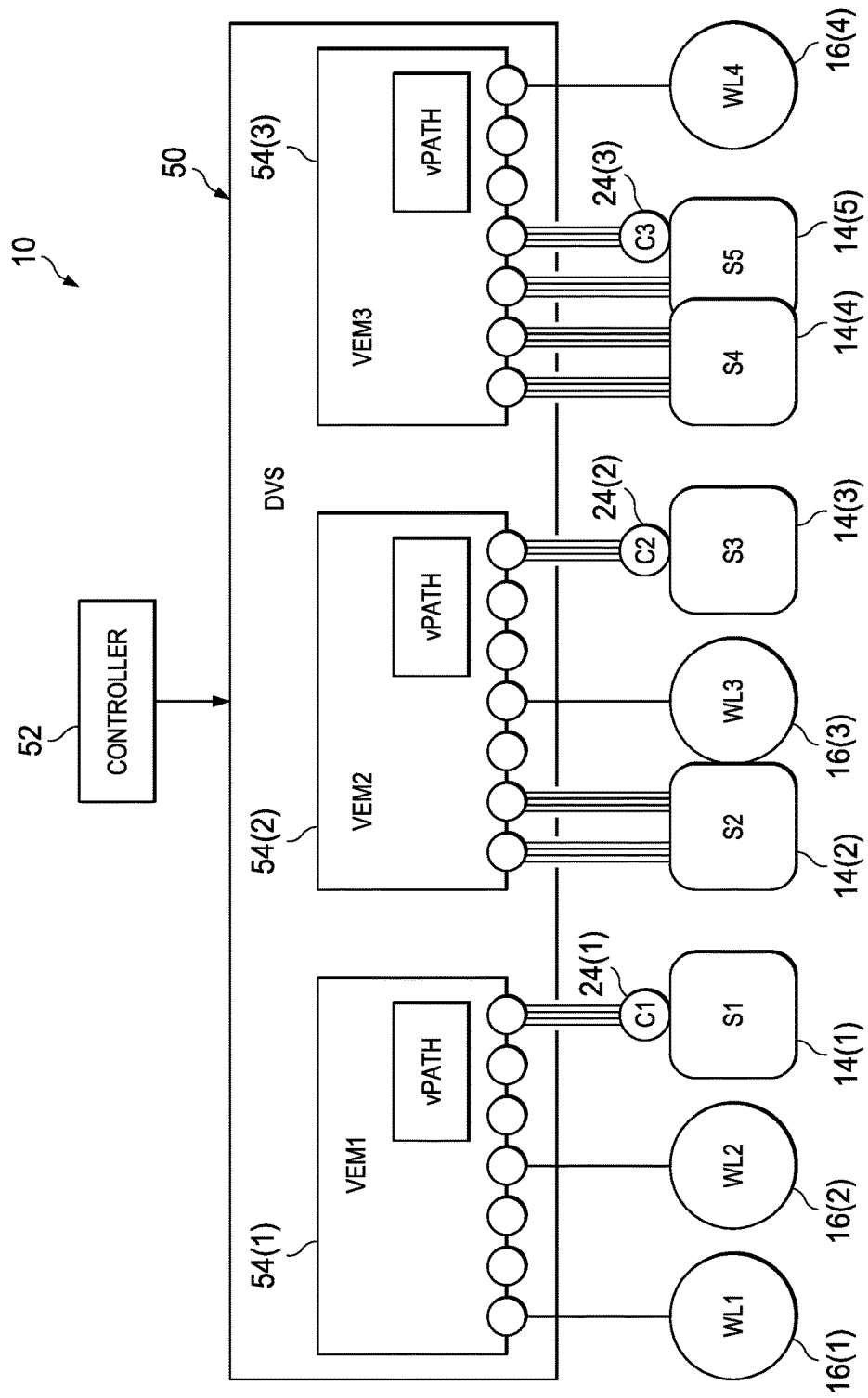
FIG. 3 is a simplified block diagram illustrating yet another embodiment of the communication system.

Turning to FIG. 3, FIG. 3 is a simplified block diagram illustrating example details of an embodiment of communication system 10. Network 12 may include a DVS 50 controlled by a central controller 52 and comprising various virtual Ethernet modules (VEMs) 54(1)-54(3). Each VEM 54(1)-54(3) may be configured with a vPath architecture, enabling seamless distribution of traffic in and out of DVS 50. Numerous workloads 16(1)-16(4) and service nodes 14(1)-14(5) may interact with DVS 50 through appropriate interfaces. At least a portion of service nodes 14(1)-14(5) may be configured with secondary classifiers 24(1)-24(3) appropriately.

Service chains can be injected on traffic that is received (on under/over-lay network) or originated at a service node 14(1)-14(5), and also be injected for future traffic that may come through network 12 over DVS 50. vPath network programmability may include service chains, wherein service chains may be associated with flow specification (or flow-tuple) when the flow specification is programmed in DVS 50.

In some embodiments, for example, where service nodes inject service chains, the service nodes may first interact with controller 52 to program the service chains and obtain the service path identifiers. Programming the service chains may involve describing the service node attributes (e.g., including (among other parameters) the network location where the service node can be reached) and the order of the service nodes in the service chain. The interaction with controller 52 may involve standards based RESTful interface such as HTTPS or a proprietary interface. Embodiments of communication system 10 can embed solution specific classification logic into solution specific service nodes. As long as traffic arrives at the service node, either due to steering from the network on a service overlay or due to traffic reception on the underlay or origination of traffic at the service node, the service node can select and impose service chains independent of the network or infrastructure.

Merely for example purposes and not as a limitation, assume service node 14(1) comprises a load balancer. The load balancer service node 14(1) and controller 50 may interact to resolve a <virtual IP address (VIP), Server-farm> pair to a specific service-path identifier. When load balancer service node 14(1) classifies the traffic and selects a real-server in the server farm, it uses the resolved service path-identifier to inject the service chain. In this sense a terminating service or an edge service can be part of a service chain.

Figure 4:
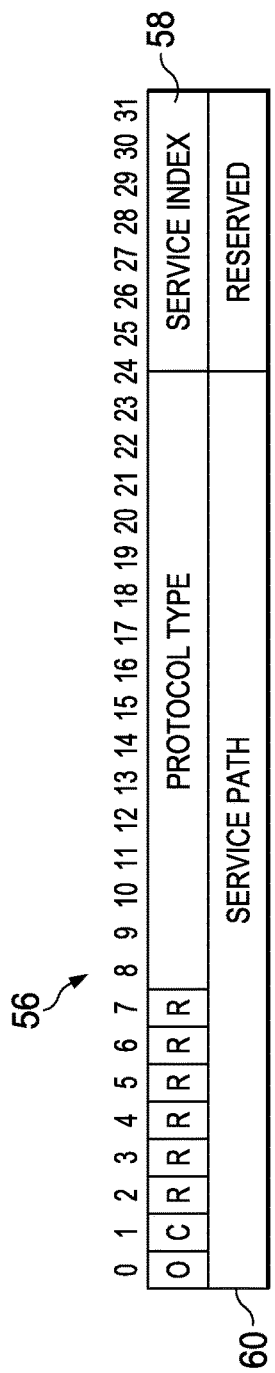
FIG. 4 is a simplified block diagram illustrating example details of embodiments of the communication system.

Turning to FIG. 4, FIG. 4 illustrates example details of a base header of a NSH 56 according to an embodiment of communication system 10. A service index field 58 and a service path field 60 may be included in NSH 56. During classification or re-classification, secondary classifier 24 may update service index field 58 and service path field 60 appropriately. Note that NSH 56 may include various other fields, and may be presented in various different formats (e.g., wherein fields are placed in locations different from those shown in the figure), all of which are included within the broad scope of the embodiments of communication system 10.

Figure 5:
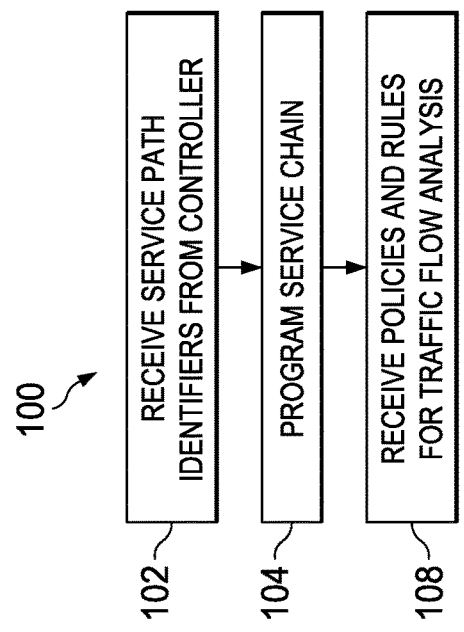
FIG. 5 is a simplified flow diagram illustrating example operations that may be associated with an embodiment of the communication system.

Turning to FIG. 5, FIG. 5 is a simplified flow diagram illustrating example operations 100 that may be associated with embodiments of communication system 10. At 102, service node 14 may receive service path identifiers from controller 52. At 104, service node 14 may program various service chains into secondary classifier 24 according to the service path identifiers. At 108, service node 14 may receive policies 34 and rules 36 for traffic flow analysis. In various embodiments, policies 34 and rules 36 may be specific to the services provided by service node 14.

Figure 6:
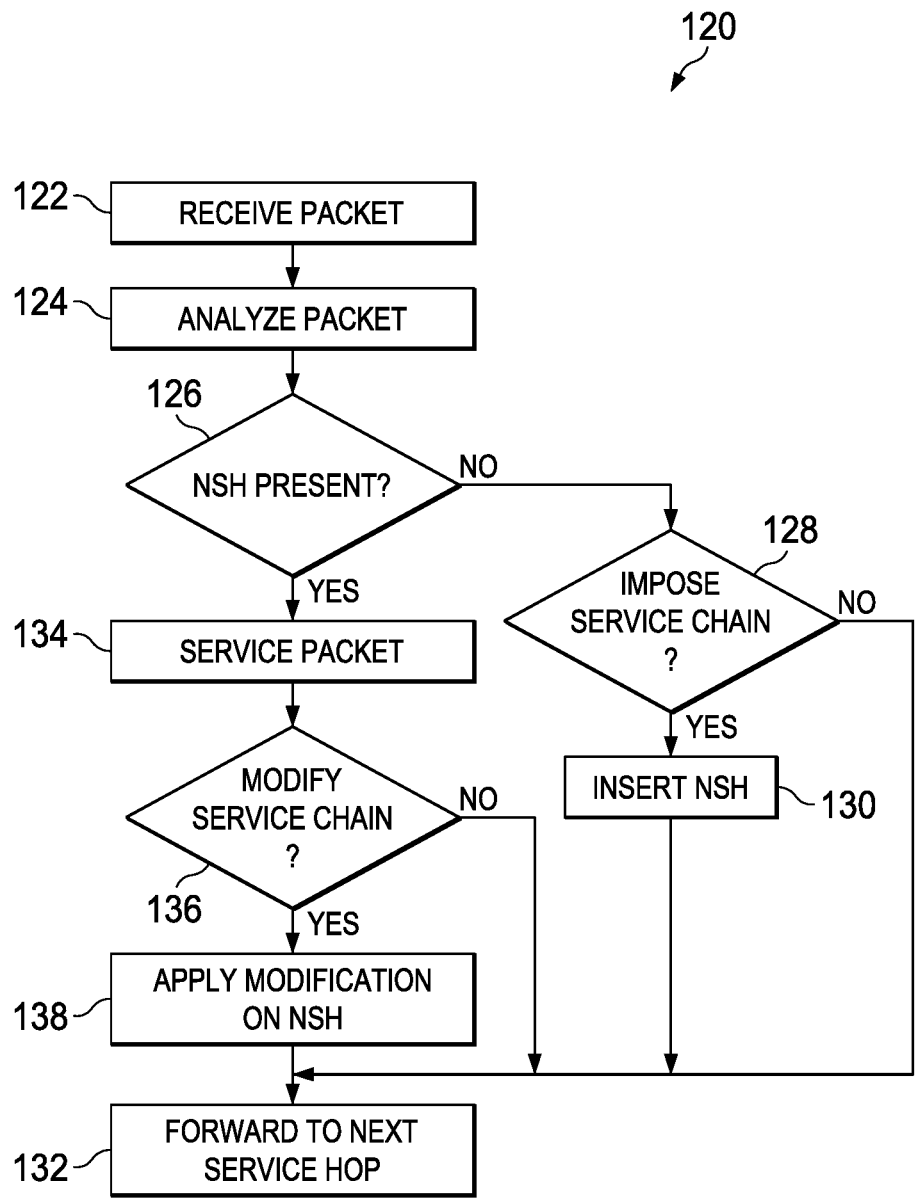
FIG. 6 is a simplified flow diagram illustrating other example operations that may be associated with an embodiment of the communication system.

Turning to FIG. 6, FIG. 6 is a simplified flow diagram illustrating example operations 120 that may be associated with embodiments of communication system 10. At 122, a packet (e.g., 18) may be received at service node 14. At 124, packet 18 may be analyzed by secondary classifier 24 in service node 14. At 126, a determination may be made whether NSH 56 is present in packet 18. If not, at 128, a determination may be made to impose a new service chain. If the determination is positive, a new service chain may be imposed by inserting a new NSH in packet 18 at 130. Packet 18 may be forwarded to the next service hop in the service chain at 132. If the determination at 128 is negative, the packet may be directly forwarded to the next service hop (or destination).

Turning back to 126, if NSH 56 is present in packet 18, at 134, appropriate services may be performed on packet 18. At 136, a determination may be made whether to modify the existing service chain. If not, packet 18 may be forwarded to the next service hop at 132. Otherwise, modifications may be applied on NSH 56 at 138, and packet 18 may be forwarded to the next service hop at 132.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, service node 14. In some embodiments, one or more of these features may be implemented in hardware, provided external to these elements, or consolidated in any appropriate manner to achieve the intended functionality. The various network elements (e.g., service node 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, service node 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 46) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 44) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, at a service node in a network environment, service path identifiers from a central controller in the network;
receiving, at the service node, policies and rules specific to services provided by the service node;
configuring, by the service node according to the service path identifiers, the policies and the rules, a first service chain comprising a first sequence of service nodes providing a first of network services and a second service chain comprising a second sequence of service nodes providing a second set of network services;
analyzing a data packet according to the policies and rules, wherein the data packet is assigned to the first service chain by the central controller;
selecting, by the service node the second service chain based on the analysis; and
associating the data packet with the selected second service chain.

2. The method of claim 1, wherein analyzing the data packet comprises determining if the data packet includes a service header.

3. The method of claim 2, wherein the associating comprises modifying the service header to specify the selected service chain.

4. The method of claim 3, wherein modifying the service header comprises updating a service path field and service index field in the service header to indicate the selected service chain.

5. The method of claim 2, wherein if the data packet does not include the service header, the associating comprises adding the service header to the data packet.

6. The method of claim 1, wherein analyzing the data packet comprises applying the policies and rules to the data packet.

7. The method of claim 1, wherein analyzing the data packet comprises identifying a state of a flow to which the data packet belongs, wherein subsequent data packets of the flow are associated with the selected service chain.

8. The method of claim 1, wherein the selected service chain is chosen irrespective of a flow to which the data packet belongs, wherein the first service chain is selected for certain data packets of the flow and the second service chain is selected for certain other data packets of the flow.

9. The method of claim 1, wherein the analysis is specific to the service node, wherein two different service nodes in the network correspondingly provide different network services to the data packet.

10. The method of claim 1, wherein the network comprises a distributed virtual switch (DVS) including a plurality of virtual Ethernet modules (VEMs) in communication with the central controller and a plurality of service nodes.

11. Non-transitory tangible media that includes instructions for execution, which when executed by a processor of a service node in a network environment, is operable to perform operations comprising:
receiving, at the service node, service path identifiers from a central controller in the network;
receiving, at the service node, policies and rules specific to services provided by the service node;
configuring, by the service node according to the service path identifiers, the policies and the rules, a first service chain comprising a first sequence of service nodes providing a first of network services and a second service chain comprising a second sequence of service nodes providing a second set of network services;
analyzing a data packet according to the policies and rules, wherein the data packet is assigned to the first service chain by the central controller;
selecting by the service node the second service chain based on the analysis; and
associating the data packet with the selected second service chain.

12. The media of claim 11, wherein analyzing the data packet comprises determining if the data packet includes a service header.

13. The media of claim 12, wherein if the data packet does not include the service header, the associating comprises adding the service header to the data packet.

14. The media of claim 11, wherein the selected service chain is chosen irrespective of a flow to which the data packet belongs, wherein the first service chain is selected for certain data packets of the flow and the second service chain is selected for certain other data packets of the flow.

15. The media of claim 11, wherein the analysis is specific to the service node, wherein two different service nodes in the network correspondingly provide different network services to the data packet.

16. An apparatus in a network environment, comprising:
a memory element for storing data; and
a processor, wherein the processor executes instructions associated with the data, wherein the processor and the memory element cooperate, such that the apparatus is configured for:
receiving, at the apparatus, service path identifiers from a central controller in the network;
receiving, at the service node, policies and rules specific to services provided by the service node;
configuring, by the service node according to the service path identifiers, the policies and the rules, a first service chain comprising a first sequence of service nodes providing a first of network services and a second service chain comprising a second sequence of service nodes providing a second set of network services;
analyzing a data packet according to the policies and rules, wherein the data packet is assigned to the first service chain by the central controller;
selecting, by the service node the second service chain based on the analysis; and
associating the data packet with the selected second service chain.

17. The apparatus of claim 16, wherein analyzing the data packet comprises determining if the data packet includes a service header.

18. The apparatus of claim 17, wherein if the data packet does not include the service header, the associating comprises adding the service header to the data packet.

19. The apparatus of claim 16, wherein the selected service chain is chosen irrespective of a flow to which the data packet belongs, wherein the first service chain is selected for certain data packets of the flow and the second service chain is selected for certain other data packets of the flow.

20. The apparatus of claim 16, wherein the analysis is specific to the service node, wherein two different service nodes in the network correspond provide different network services to the data packet.

* * * * *